US006484080B2

(12) United States Patent
Breed

(10) Patent No.: US 6,484,080 B2
(45) Date of Patent: *Nov. 19, 2002

(54) METHOD AND APPARATUS FOR CONTROLLING A VEHICULAR COMPONENT

(75) Inventor: David S. Breed, Boonton Township, Morris County, NJ (US)

(73) Assignee: Automotive Technologies International Inc., Denville, NJ (US)

( * ) Notice: Subject to any disclaimer, the term of this patent is extended or adjusted under 35 U.S.C. 154(b) by 45 days.

This patent is subject to a terminal disclaimer.

(21) Appl. No.: 09/753,186

(22) Filed: Jan. 2, 2001

(65) Prior Publication Data

US 2001/0002451 A1 May 31, 2001

Related U.S. Application Data

(63) Continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437
(60) Provisional application No. 60/231,378, filed on Sep. 8, 2000.

(51) Int. Cl.⁷ .................................................. G06F 7/00
(52) U.S. Cl. ........................... 701/36; 701/29; 701/34
(58) Field of Search ...................... 701/29, 30, 34, 701/36, 45; 340/438, 439; 307/9.1

(56) References Cited

U.S. PATENT DOCUMENTS

| 4,128,005 A | 12/1978 | Arnston et al. ............. 73/117.3 |
| 4,418,388 A | 11/1983 | Allgor et al. ........... 364/431.01 |
| 4,817,418 A | 4/1989 | Asami et al. ............... 73/118.1 |
| 4,989,146 A | 1/1991 | Imajo ........................... 701/29 |
| 5,041,976 A | 8/1991 | Marko et al. .......... 364/424.03 |
| 5,123,017 A | 6/1992 | Simpkins et al. ............. 714/26 |
| 5,164,901 A | 11/1992 | Blackburn et al. ............ 701/47 |
| 5,313,407 A | 5/1994 | Tiernan et al. .............. 364/508 |
| 5,325,082 A | 6/1994 | Rodriguez ................... 340/438 |
| 5,333,240 A | 7/1994 | Matsumoto et al. .......... 706/20 |
| 5,400,018 A | 3/1995 | Scholl et al. .......... 340/825.54 |
| 5,406,502 A | 4/1995 | Haramaty et al. ..... 364/551.01 |
| 5,420,794 A | 5/1995 | James ........................ 701/117 |
| 5,442,553 A | 8/1995 | Parrillo .................. 364/424.04 |
| 5,481,906 A | 1/1996 | Nagayoshi et al. ........... 73/116 |
| 5,594,740 A | 1/1997 | LaDue ......................... 379/59 |
| 5,754,965 A | 5/1998 | Hagenbuch |

(List continued on next page.)

FOREIGN PATENT DOCUMENTS

WO         00/29257        5/2000

OTHER PUBLICATIONS

Liubakka et al., "Failure Detection Algorithm Applied To Control System Design For Improved Diagnostic And Reliability", SAE Technical Paper Series, 02–29 To 04–04, 1988, pp. 1–7.

(List continued on next page.)

*Primary Examiner*—Yonel Beaulieu
(74) *Attorney, Agent, or Firm*—Brian Roffe

(57) ABSTRACT

Control system and method for controlling a part of the vehicle in which sensor systems are mounted at different locations on the vehicle, each sensor system providing a measurement related to a state of the sensor system or a measurement related to a state of the mounting location. A processor coupled to the sensor systems diagnoses the state of the vehicle based on the measurements of the sensor system, e.g., by the application of a pattern recognition technique. The processor controls the part based at least in part on the diagnosed state of the vehicle. At least one of the sensor systems may be a high dynamic range accelerometer or a sensor selected from a group consisting of a single axis acceleration sensor, a double axis acceleration sensor, a triaxial acceleration sensor and a gyroscope, and may optionally include an RFID response unit.

62 Claims, 7 Drawing Sheets

U.S. PATENT DOCUMENTS

| | | | | |
|---|---|---|---|---|
| 5,809,437 | A | 9/1998 | Breed | 701/29 |
| 5,829,782 | A | 11/1998 | Breed et al. | 280/735 |
| 5,955,942 | A | 9/1999 | Slifkin et al. | 340/436 |
| 6,144,859 | A | 11/2000 | LaDue | 455/511 |
| 6,175,787 | B1 * | 1/2001 | Breed | 701/29 |
| 6,295,492 | B1 | 9/2001 | Lang et al. | 701/33 |
| 6,339,736 | B1 | 1/2002 | Moskowitz et al. | 701/29 |
| 6,356,822 | B1 | 3/2002 | Diaz et al. | 701/33 |

OTHER PUBLICATIONS

James et al., "Microprocessor Based Data Acquisition For Analysis Of Engine Performance", SAE Technical Paper Series, Feb. 23–27, 1987, p. 1–9.

Engine Monitoring Based on Normalized Vibration Spectra, NASA Tech Briefs, MFS–26529, 1994.

V.K. Varadan et al., "Conformal MEMS–IDT Gyroscopes and Their Comparison with Fiber Optic Gyro, Smart Structures and Materials 2000", Smart Electronics and MEMS, Proceedings of SPIE vol. 3990 (2000), pp. 335–344.

H.K. Tonshoff et al., "Using Acoustic Emission Signals for Monitoring of Production Processes", Ultrasonics 37 (2000), pp. 681–686, 2000.

Design and Development of a MEMS–IDT Gyroscope. V.K. Varadan et al., Smart Mater. Struct. vol. 9, Jul. 21, 2000, pp. 898–905.

Microsensors, Microelectronmechanical Systems (MEMS), and Electronics for Smart Structures and Systems, V.K. Varadan et al., Smart Mater. Struct., vol. 9, Feb., 1999, pp. 953–972.

Abstract of Wireless Remote Accelerometer, V.K. Varadan et al., in Physics of Semiconductor Devices, vol. 1: Proceedings of the $9^{th}$ International Workshop on Physics of Semiconductor Devices (IWPSD), Delhi, India, Dec. 6–20, 1997.

* cited by examiner

METHOD AND APPARATUS FOR CONTROLLING A VEHICULAR COMPONENT

CROSS-REFERENCE TO RELATED APPLICATIONS

This application is a continuation-in-part of U.S. patent application Ser. No. 09/137,918 filed Aug. 20, 1998, now U.S. Pat. No. 6,175,787, which is a continuation-in-part of U.S. patent application Ser. No. 08/476,077 filed Jun. 7, 1995, now U.S. Pat. No. 5,809,437.

This application claims priority under 35 U.S.C. §119(e) of U.S. provisional patent application Ser. No. 60/231,378 filed Sep. 8, 2000.

FIELD OF THE INVENTION

This invention relates to systems and method for diagnosing the state or condition of a vehicle, e.g., whether the vehicle is about to rollover or is experiencing a crash and whether the vehicle has a component which is operating abnormally and could possibly fail resulting in a crash or severe handicap for the operator, and controlling a component of the vehicle in consideration of the diagnosed state or condition of the vehicle.

BACKGROUND OF THE INVENTION

Every automobile driver fears that his or her vehicle will breakdown at some unfortunate time, e.g., when he or she is traveling at night. during rush hour, or on a long trip away from home. To help alleviate that fear, certain luxury automobile manufacturers provide roadside service in the event of a breakdown. Nevertheless, unless the vehicle is equipped with OnStar or an equivalent service, the vehicle driver must still be able to get to a telephone to call for service. It is also a fact that many people purchase a new automobile out of fear of a breakdown with their current vehicle. This invention is primarily concerned with preventing breakdowns and with minimizing maintenance costs by predicting component failure that would lead to such a breakdown before it occurs.

When a vehicle component begins to fail, the repair cost is frequently minimal if the impending failure of the component is caught early, but increases as the repair is delayed. Sometimes if a component in need of repair is not caught in a timely manner, the component, and particularly the impending failure thereof, can cause other components of the vehicle to deteriorate. One example is where the water pump fails gradually until the vehicle overheats and blows a head gasket. It is desirable, therefore, to determine that a vehicle component is about to fail as early as possible so as to minimize the probability of a breakdown and the resulting repair costs.

There are various gages on an automobile which alert the driver to various vehicle problems. For example, if the oil pressure drops below some predetermined level, the driver is warned to stop his vehicle immediately. Similarly, if the coolant temperature exceeds some predetermined value, the driver is also warned to take immediate corrective action. In these cases, the warning often comes too late as most vehicle gages alert the driver after he or she can conveniently solve the problem. Thus, what is needed is a component failure warning system that alerts the driver to the impending failure of a component sufficiently in advance of the time when the problem gets to a catastrophic point.

Some astute drivers can sense changes in the performance of their vehicle and correctly diagnose that a problem with a component is about to occur. Other drivers can sense that their. vehicle is performing differently but they don't know why or when a component will fail or how serious that failure will be, or possibly even what specific component is the cause of the difference in performance. The invention disclosed herein will. in most cases, solve this problem by predicting component failures in time to permit maintenance and thus prevent vehicle breakdowns.

Presently, automobile sensors in use are based on specific predetermined or set levels, such as the coolant temperature or oil pressure, whereby an increase above the set level or a decrease below the set level will activate the sensor, rather than being based on changes in this level over time. The rate at which coolant heats up, for example, can be an important clue that some component in the cooling system is about to fail. There are no systems currently on automobiles to monitor the numerous vehicle components over time and to compare component performance with normal performance. Nowhere in the vehicle is the vibration signal of a normally operating front wheel stored, for example, or for that matter, any normal signal from any other vehicle component. Additionally, there is no system currently existing on a vehicle to look for erratic behavior of a vehicle component and to warn the driver or the dealer that a component is misbehaving and is therefore likely to fail in the very near future.

Sometimes, when a component fails, a catastrophic accident results. In the Firestone tire case, for example, over 100 people were killed when a tire of a Ford Explorer blew out which caused the Ford Explorer to rollover. Similarly, other component failures can lead to loss of control of the vehicle and a subsequent accident. It is thus very important to accurately forecast that such an event will take place but furthermore, for those cases where the event takes place suddenly without warning, it is also important to diagnose the state of the entire vehicle, which in some cases can lead to automatic corrective action to prevent unstable vehicle motion or rollovers resulting in an accident. Finally, an accurate diagnostic system for the entire vehicle can determine much more accurately the severity of an automobile crash once it has begun by knowing where the accident is taking place on the vehicle (e.g., the part of or location on the vehicle which is being impacted by an object) and what is colliding with the vehicle based on a knowledge of the force deflection characteristics of the vehicle at that location. Therefore, in addition to a component diagnostic, the teachings of this invention also provide a diagnostic system for the entire vehicle prior to and during accidents. In particular, this invention is concerned with the simultaneous monitoring of multiple sensors on the vehicle so that the best possible determination of the state of the vehicle can be determined. Current crash sensors operate independently or at most one sensor may influence the threshold at which another sensor triggers a deployable restraint. In the teachings of this invention, two or more sensors, frequently accelerometers, are monitored simultaneously and the combination of the outputs of these multiple sensors are combined continuously in making the crash severity analysis.

Marko et al. (U.S. Pat. No. 5,041,976) is directed to a diagnostic system using pattern recognition for electronic automotive control systems and particularly for diagnosing faults in the engine of a motor vehicle after they have occurred. For example, Marko et al. is interested in determining cylinder specific faults after the cylinder is operating abnormally. More specifically, Marko et al. is directed to detecting a fault in a vehicular electromechanical system indirectly, i.e., by means of the measurement of parameters of sensors which are affected by that system, and after that fault has already manifested itself in the system. In order to form the fault detecting system, the parameters from these sensors are input to a pattern recognition system for training thereof Then knows faults are introduced and the parameters from the sensors are inputted into the pattern recognition system with an indicia of the known fault. Thus, during subsequent operation, the pattern recognition system can determine the fault of the electromechanical system based on the parameters of the sensors, assuming that the fault was "trained" into the pattern recognition system and has already occurred.

When the electromechanical system is an engine, the parameters input into the pattern recognition system for training thereof, and used for fault detection during operation, all relate to the engine. (If the electromechanical system is other than the engine, then the parameters input into the pattern recognition system would relate to that system.) In other words, each parameter will be affected by the operation of the engine and depend thereon and changes in the operation of the engine will alter the parameter, e.g., the manifold absolute pressure is an indication of the airflow into the engine. In this case, the signal from the manifold absolute pressure sensor may be indicative of a fault in the intake of air into the engine, e.g., the engine is drawing in too much or too little air, and is thus affected by the operation of the engine. Similarly, the mass air flow is the airflow into the engine and is an alternative to the manifold absolute pressure. It is thus a parameter that is directly associated with, related to and dependent on the engine. The exhaust gas oxygen sensor is also affected by the operation of the engine, and thus directly associated therewith, since during normal operation, the mixture of the exhaust gas is neither rich or lean whereas during abnormal engine operation, the sensor will detect an abrupt change indicative of the mixture being too rich or too lean.

Thus, the system of Marko et al. is based on the measurement of sensors which affect or are affected by, i.e., are directly, associated with, the operation of the electromechanical system for which faults are to be detected. However, the system of Marko et al. does not detect faults in the sensors that are conducting the measurements, e.g., a fault in the exhaust gas oxygen sensor, or faults that are only developing but have not yet manifested themselves or faults in other systems. Rather, the sensors are used to detect a fault in the system after it has occurred.

Asami et al. (U.S. Pat. No. 4,817,418) is directed to a failure diagnosis system for a vehicle including a failure display means for displaying failure information to a driver. This system only reports failures after they have occurred and does not predict them.

Tiernan et al. (U.S. Pat. No. 5,313,407) is directed, inter alia, to a system for providing an exhaust active noise control system, i.e., an electronic muffler system, including an input microphone 60 which senses exhaust noise at a first location 61 in an exhaust duct 58. An engine has exhaust manifolds 56,57 feeding exhaust air to the exhaust duct 58. The exhaust noise sensed by the microphone 60 is processed to obtain an output from an output speaker 65 arranged downstream of the input microphone 61 in the exhaust path in order to cancel the noise in the exhaust duct 58.

Scholl et al. (U.S. Pat. No. 5,400,018) is directed to a method for relaying information relating to the status of a vehicle to a remote location over a communications data link.

Haramaty et al. (U.S. Pat. No. 5,406,502) describes a system that monitors a machine in a factory and notifies maintenance personnel remote from the machine (not the machine operator) that maintenance should be scheduled at a time when the machine is not in use. Haramaty et al. does not expressly relate to vehicular applications.

NASA Technical Support Package MFS-26529 "Engine Monitoring Based on Normalized Vibration Spectra", describes a technique for diagnosing engine health using a neural network based system and is incorporated by reference herein in its entirety.

A paper "Using acoustic emission signals for monitoring of production processes" by H. K. Tonshoff et al. also provides a good description of how acoustic signals can be used to predict the state of machine tools and is incorporated by reference herein in its entirety.

Preferred embodiments of the invention are described below and unless specifically noted, it is the applicant's intention that the words and phrases in the specification and claims be given the ordinary and accustomed meaning to those of ordinary skill in the applicable art(s). If applicant intends any other meaning, he will specifically state they are applying a special meaning to a word or phrase.

Likewise, applicant's use of the word "function" here is not intended to indicate that the applicant seeks to invoke the special provisions of 35 U.S.C. §112, sixth paragraph, to define their invention. To the contrary, if applicant wishes to invoke the provisions of 35 U.S.C. §112, sixth paragraph, to define their invention, he will specifically, set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

OBJECTS AND SUMMARY OF THE INVENTION

Accordingly, it is an object of the present invention to solve the above problems by monitoring the patterns of signals emitted from the vehicle components and, through the use of pattern recognition technology, forecasting component failures before they occur. Vehicle component behavior is monitored over time in contrast to currently used systems that merely wait until a serious condition occurs. It is another object of the present invention to provide a new and improved on-board vehicle diagnostic module utilizing pattern recognition technologies which are trained to differentiate normal from abnormal component behavior. In this manner, the problems discussed above, as well as many others, are alleviated by the vehicle diagnostic module described in the paragraphs below.

It is yet another object of the present invention to provide a diagnostic module that determines whether a component is operating normally or abnormally based on a time series of data from a single sensor or from multiple sensors that contain a pattern indicative of the operating status of the component.

It is still another object of the present invention to provide a diagnostic module that determines whether a component is operating normally or abnormally based on data from one or more sensors that are not directly associated with the component, i.e., do not depend on the operation of the component.

It is an additional object of the present invention to simultaneously monitor several sensors, primarily accelerometers, gyroscopes and strain gages, to determine the state of the vehicle and optionally its occupants and to determine that a vehicle is out of control and possibly headed for an accident, for example. If so, then a signal can be sent to a part of the vehicle control system to attempt to re-establish stability. If this is unsuccessful, then the same system of sensors can monitor the early stages of a crash to make an assessment of the severity of the crash and what occupant protection systems should be deployed and how such occupant protection systems should be deployed.

The diagnostic module in accordance with the invention utilizes information which already exists in signals emanating from various vehicle components along with sensors which sense these signals and, using pattern recognition techniques, compares these signals with patterns characteristic of normal and abnormal component performance to predict component failure, vehicle instability or a crash earlier than would otherwise occur if the diagnostic module was not utilized. If fully implemented, this invention is a total diagnostic system of the vehicle. In most implementations, the module is attached to the vehicle and electrically connected to the vehicle data bus where it analyzes data appearing on the bus to diagnose components of the vehicle. In some implementations, multiple distributed accelerometers and/or microphones are present on the vehicle and, in some cases, some of the sensors will communicate using wireless technology to the vehicle bus or directly to the diagnostic module.

Principal objects and advantages of this invention are thus:

1. To prevent vehicle breakdowns.
2. To alert the driver of the vehicle that a component of the vehicle is functioning differently than normal and might be in danger of failing.
3. To alert the dealer, or other repair facility, that a component of the vehicle is functioning differently than normal and is in danger of failing.
4. To provide an early warning of a potential component failure and to thereby minimize the cost of repairing or replacing the component.
5. To provide a device which will capture available information from signals emanating from vehicle components for a variety of uses such as current and future vehicle diagnostic purposes.
6. To provide a device that uses information from existing sensors for new purposes thereby increasing the value of existing sensors and, in some cases, eliminating the need for sensors that provide redundant information.
7. To provide a device which is trained to recognize deterioration in the performance of a vehicle component, or of the entire vehicle, based on information in signals emanating from the component or from vehicle angular and linear accelerations.
8. To provide a device which analyzes vibrations from various vehicle components that are transmitted through the vehicle structure and sensed by existing vibration sensors such as vehicular crash sensors used with airbag systems or by special vibration sensors, accelerometers, or gyroscopes.
9. To provide a device which provides information to the vehicle manufacturer of the events leading to a component failure.
10. To apply pattern recognition techniques based on training to diagnosing potential vehicle component failures.
11. To apply component diagnostic techniques in combination with intelligent or smart highways wherein vehicles may be automatically guided without manual control in order to permit the orderly exiting of the vehicle from a restricted roadway prior to a breakdown of the vehicle.
12. To apply trained pattern recognition techniques using multiple sensors to provide an early prediction of the existence and severity of an accident.
13. To utilize pattern recognition techniques and the output from multiple sensors to determine at an early stage that a vehicle rollover might occur and to take corrective action through control of the vehicle acceleration, brakes and steering to prevent the rollover or if it is preventable, to deploy side head protection airbags to reduce the injuries.
14. To use the output from multiple sensors to determine that the vehicle is skidding or sliding and to send messages to the various vehicle control systems to activate the throttle, brakes and/or steering to correct for the vehicle sliding or skidding motion.

Other objects and advantages of the present invention will become apparent from the following description of the preferred embodiments taken in conjunction with the accompanying drawings.

SUMMARY OF THE INVENTION

Accordingly, in one embodiment of the invention, the state of the entire vehicle is diagnosed whereby two or more sensors, preferably acceleration sensors and gyroscopes, detect the state of the vehicle and if the state is abnormal, output means are coupled to the processor means for affecting another system in the vehicle. The another system may be the steering control system, the brake system, the accelerator or the frontal or side occupant protection system. An exemplifying control system for controlling a part of the vehicle in accordance with the invention thus comprises a plurality of sensor systems mounted at different locations on the vehicle, each sensor system providing a measurement related to a state of the sensor system or a measurement related to a state of the mounting location, and a processor coupled to the sensor systems and arranged to diagnose the state of the vehicle based on the measurements of the sensor system, e.g., by the application of a pattern recognition technique The processor controls the part based at least in part on the diagnosed state of the vehicle. At least one of the sensor systems may be a high dynamic range accelerometer or a sensor selected from a group consisting of a single axis acceleration sensor, a double axis acceleration sensor, a triaxial acceleration sensor and a gyroscope, and may optionally include an RFID response unit. The gyroscope may be a MEMS-IDT gyroscope including a surface acoustic wave resonator which applies standing waves on a piezoelectric substrate. If an RFID response unit is present, the control system would then comprise an RFID interrogator device which causes the RFID response unit(s) to transmit a signal representative of the measurement of the sensor system associated therewith to the processor.

The state of the vehicle diagnosed by the processor may be the vehicle's angular motion, angular acceleration and/or angular velocity. As such, the steering system, braking system or throttle system may be controlled by the processor in order to maintain the stabilit of the vehicle. The processor can also be arranged to control an occupant restraint or protection device in an attempt to minimize injury to an occupant.

The state of the vehicle diagnosed by the processor may also be a determination of a location of an impact between the vehicle and another object. In this case, the processor can forecast the severity of the impact using the force/crush properties of the vehicle at the impact location and control an occupant restraint or protection device based at least in part on the severity of the impact.

The system can also include a weight sensing system coupled to a seat in the vehicle for sensing the weight of an occupying item of the seat. The weight sensing system is coupled to the processor whereby the processor controls deployment or actuation of the occupant restraint or protection device based on the state of the vehicle and the weight of the occupying item of the seat sensed by the weight sensing system.

A display may be coupled to the processor for displaying an indication of the state of the vehicle as diagnosed by the processor. A warning device may be coupled to the processor for relaying a warning to an occupant of the vehicle relating to the state of the vehicle as diagnosed by the processor. Further, a transmission device may be coupled to. the processor for transmitting a signal to a remote site relating to the state of the vehicle as diagnosed by the processor.

The state of the vehicle diagnosed by the processor may include angular acceleration of the vehicle whereby angular velocity and angular position or orientation are derivable from the angular acceleration. The processor can then be arranged to control the vehicle's navigation system based on the angular acceleration of the vehicle.

A method for controlling a part of the vehicle in accordance with the invention comprises the step of mounting a plurality of sensor systems at different locations on the vehicle, measuring a state of the sensor system or a state of the respective mounting location of the sensor system, diagnosing the state of the vehicle based on the measurements of the state of the sensor systems or the state of the mounting locations of the sensor systems, and controlling the part based at least in part on the diagnosed state of the vehicle. The state of the sensor system may be any one or more of the acceleration, angular acceleration, angular velocity or angular orientation of the sensor system. Diagnosis of the state of the vehicle may entail determining whether the vehicle is stable or is about to rollover or skid and/or determining a location of an impact between the vehicle and another object. Diagnosis of the state of the vehicle may also entail determining angular acceleration of the vehicle based on the acceleration measured by accelerometers if multiple accelerometers are present as the sensor systems.

Another control system for controlling a part of the vehicle in accordance with the invention comprises a plurality of sensor systems mounted on the vehicle, each providing a measurement of a state of the sensor system or a state of the mounting location of the sensor system and generating a signal representative of the measurement, and a pattern recognition system for receiving the signals from the sensor systems and diagnosing the state of the vehicle based on the measurements of the sensor systems. The pattern recognition system generates a control signal for controlling the part based at least in part on the diagnosed state of the vehicle. The pattern recognition system may comprise one or more neural networks. The features of the control system described above may also be incorporated into this control system to the extent feasible.

The state of the vehicle diagnosed by the pattern recognition system may include a state of an abnormally operating component whereby the pattern recognition system is designed to identify, a potentially malfunctioning component based on the state of the component measured by the sensor systems and determine whether the identified component is operating abnormally based on the state of the component measured by the sensor systems.

In one preferred embodiment, the pattern recognition system may comprise a neural network system and the state of the vehicle diagnosed by the neural network system includes a state of an abnormally operating component. The neural network system includes a first neural network for identifying a potentially malfunctioning component based on the state of the component measured by the sensor systems and a second neural network for determining whether the identified component is operating abnormally based on the state of the component measured by the sensor systems.

Modular neural networks can also be used whereby the neural network system includes a first neural network arranged to identify, a potentially malfunctioning component based on the state of the component measured by the sensor systems and a plurality of additional neural networks. Each of the additional neural networks is trained to determine whether a specific component is operating abnormally so that the measurements of the state of the component from the sensor systems are input into that one of the additional neural networks trained on a component which is substantially identical to the identified component.

Another method for controlling a part of the vehicle comprises the steps of mounting a plurality of sensor systems on the vehicle, measuring a state of the sensor system or a state of the respective mounting location of the sensor system, generating signals representative of the measurements of the sensor systems, inputting the signals into a pattern recognition system to obtain a diagnosis of the state of the vehicle and controlling the part based at least in part on the diagnosis of the state of the vehicle.

In one notable embodiment, a potentially malfunctioning component is identified by the pattern recognition system based on the states measured by the sensor systems and the pattern recognition system determine whether the identified component is operating abnormally based on the states measured by the sensor systems. If the pattern recognition system comprises a neural network system, identification of the component entails inputting the states measured by the sensor systems into a first neural network of the neural network system and the determination of whether the identified component is operating abnormally entails inputting the states measured by the sensor systems into a second neural network of the neural network system. A modular neural network system can also be applied in which the states measured by the sensor systems are input into a first neural network and a plurality of additional neural networks are provided, each being trained to determine whether a specific component is operating abnormally, whereby the states measured by the sensor systems are input into that one of the additional neural networks trained on a component which is substantially identical to the identified component.

Another control system for controlling a part of the vehicle based on occupancy of the seat in accordance with the invention comprises a plurality of strain gages mounted in connection with the seat, each measuring strain of a respective mounting location caused by occupancy of the seat, and a processor coupled to the strain gages and arranged to determine the weight of an occupying item based on the strain measurements from the strain gages over a period of time, i.e., dynamic measurements. The processor controls the part based at least in part on the determined weight of the occupying item of the seat. The processor can also determine motion of the occupying item of the seat based on the strain measurements from the strain gages over the period of time. One or more accelerometers may be mounted on the vehicle for measuring acceleration in which case, the processor may control the part based at least in part on the determined weight of the occupying item of the seat and the acceleration measured by the accelerometer(s).

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, a characterization can be made of the occupancy of the scat. Not only can the weight of an object occupying the seat be determined, but also the gross motion of such an object can be ascertained and thereby an assessment can be made as to whether the object is a life form such as a human being. Strain gage weight sensors are disclosed in co-pending U.S. patent application Ser. No. 09/193,209 filed Nov. 17, 1998 (corresponding to International Publication No. WO 00/29257), which is included in here in its entirety as if the entire application were printed herein. By reference. In particular, the inventors contemplate the combination of all of the ideas expressed in this patent application with those expressed in the current invention.

As used herein, a diagnosis of the "state of the vehicle" means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

As used herein, an "occupant restraint device" includes any type of device which is deployable in the event of a crash involving the vehicle for the purpose of protecting an occupant from the effects of the crash and/or minimizing the potential injury to the occupant. Occupant restraint devices thus include frontal airbags, side airbags, seatbelt tensioners, knee bolsters, side curtain airbags, externally deployable airbags and the like.

As used herein, a "part" of the vehicle includes any component, sensor, system or subsystem of the vehicle such as the steering system, braking system, throttle system, navigation system, airbag system, seatbelt retractor, air bag inflation valve, air bag inflation controller and airbag vent valve, as well as those listed below in the definitions of "component" and "sensor".

As used herein, a "sensor system" includes any of the sensors listed below in the definition of "sensor" as well as any type of component or assembly of components which detect, sense or measure something.

BRIEF DESCRIPTION OF THE DRAWINGS

The following drawings are illustrative of embodiments of the invention and are not meant to limit the scope of the invention as encompassed by the claims.

DESCRIPTION OF THE PREFERRED EMBODIMENTS

Figure 1:
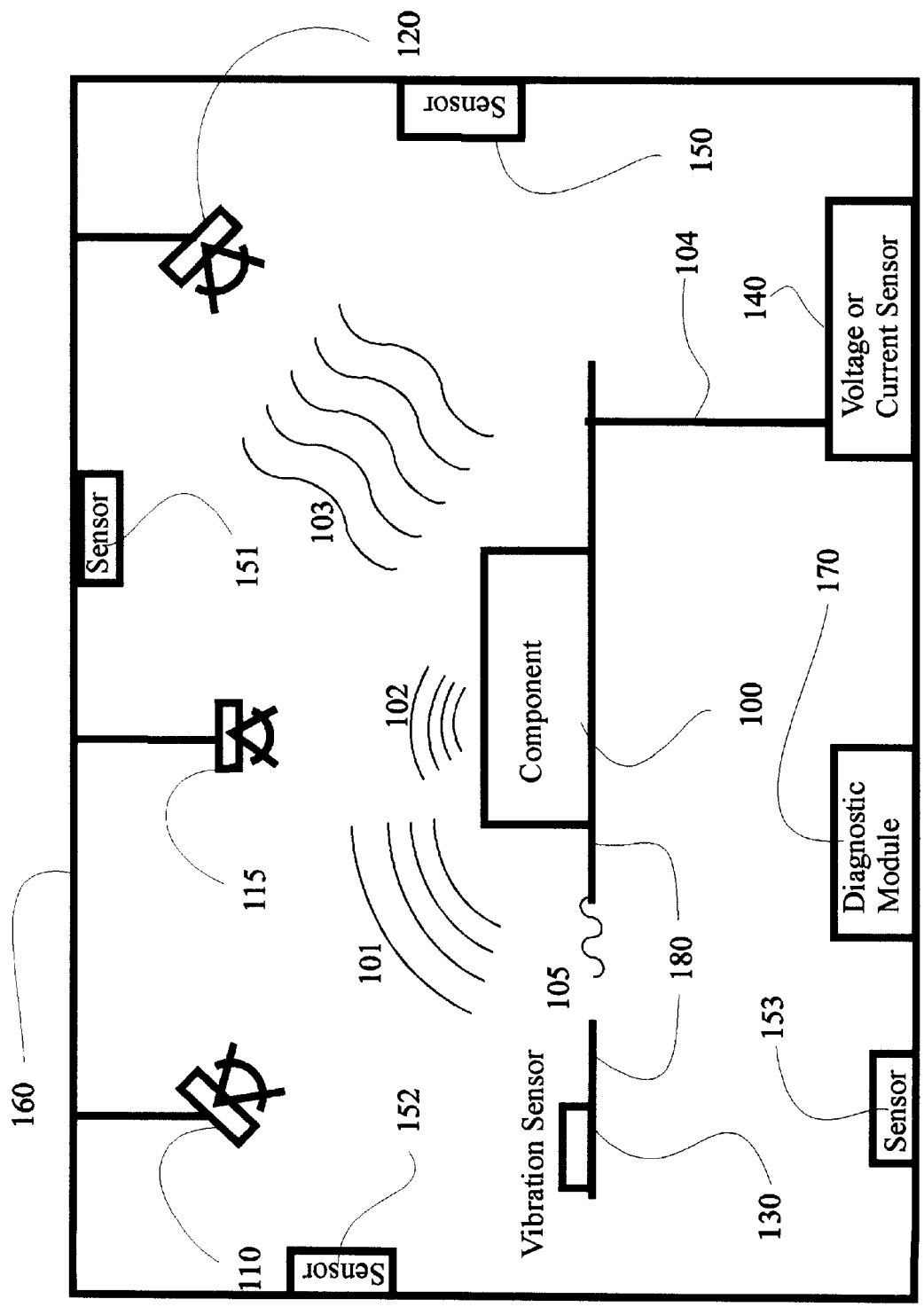
FIG. 1 is a schematic illustration of a generalized component with several signals being emitted and transmitted along a variety of paths, sensed by a variety of sensors and analyzed by the diagnostic module in accordance with the invention and for use in a method in accordance with the invention.

For the purposes herein the following terms are defined as follows:

The term "component" refers to any part or assembly of parts which is mounted to or a part of a motor vehicle and which is capable of emitting a signal representative of its operating state. The following is a partial list of general automobile and truck components, the list not being exclusive:

engine;

transmission;

brakes and associated brake assembly;

tires;

wheel;

steering wheel and steering column assembly;

water pump;

alternator, shock absorber;

wheel mounting assembly;

radiator;

battery;

oil pump;

fuel pump;

air conditioner compressor;

differential gear;

exhaust system;

fan belts;
engine valves;
steering assembly;
vehicle suspension including shock absorbers;
vehicle wiring system; and
engine cooling fan assembly.

The term "sensor" refers to any measuring or sensing device mounted on a vehicle or any of its components including new sensors mounted in conjunction with the diagnostic module in accordance with the invention. A partial, non-exclusive list of common sensors mounted on an automobile or truck is as follows:

airbag crash sensor;
accelerometer;
microphone;
camera;
antenna, capacitance sensor or other electromagnetic wave sensor;
stress or strain sensor;
pressure sensor;
weight sensor;
magnetic field sensor;
coolant thermometer;
oil pressure sensor;
oil level sensor;
air flow meter;
voltmeter;
ammeter;
humidity sensor;
engine knock sensor;
oil turbidity sensor;
throttle position sensor;
steering-wheel torque sensor;
wheel speed sensor;
tachometer;
speedometer;
other velocity sensors;
other position or displacement sensors;
oxygen sensor;
yaw, pitch and roll angular sensors;
clock;
odometer;
power steering pressure sensor;
pollution sensor;
fuel gauge;
cabin thermometer;
transmission fluid level sensor;
gyroscopes or other angular rate sensors including yaw, pitch and roll rate sensors;
coolant level sensor;
transmission fluid turbidity sensor;
break pressure sensor;
tire pressure sensor;
tire temperature sensor, and
coolant pressure sensor.

The term "signal" herein refers to any time varying output from a component including electrical, acoustic, thermal, or electromagnetic radiation, or mechanical vibration.

Sensors on a vehicle are generally designed to measure particular parameters of particular vehicle components. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag. This accelerometer continuously monitors the vibrations in the vehicle structure regardless of the source of these vibrations. If a wheel is out of balance, or if there is extensive wear of the parts of the front wheel mounting assembly, or wear in the shock absorbers, the resulting abnormal vibrations or accelerations can, in many cases, be sensed by the crash sensor accelerometer. There are other cases, however, where the sensitivity or location of the airbag crash sensor accelerometer is not appropriate and one or more additional accelerometers may be mounted onto a vehicle for the purposes of this invention. Some airbag crash sensors are not sufficiently sensitive accelerometers or have sufficient dynamic range for the purposes herein.

Every component of a vehicle emits various signals during its life. These signals can take the form of electromagnetic radiation, acoustic radiation, thermal radiation, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes which contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating thereon. Such systems have been called "smart highways" and are part of the field of intelligent transportation systems (ITS). If a vehicle operating on such a smart highway were to breakdown, serious disruption of the system could result and the safety of other users of the smart highway could be endangered.

In accordance with the invention, each of these signals emitted by the vehicle components is converted into electrical signals and then digitized (i.e., the analog signal is converted into a digital signal) to create numerical time series data which is then entered into a processor, Pattern recognition algorithms then are applied in the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

Frequently, the data entered into the computer needs to be preprocessed before being analyzed by a pattern recognition algorithm. The data from a wheel speed sensor, for example, might be used as is for determining whether a particular tire is operating abnormally in the event it is unbalanced, whereas the integral of the wheel speed data over a long time period (a preprocessing step), when compared to such sensors on different wheels, might be more useful in determining whether a particular tire is going flat and therefore needs air. In some cases, the frequencies present in a set of data are a better predictor of component failures than the data itself.

For example, when a motor begins to fail due to worn bearings, certain characteristic frequencies began to appear. In most cases, the vibrations arising from rotating components, such as the engine, will be normalized based on the rotational frequency as disclosed in the NASA TSP referenced above. Moreover, the identification of which component is causing vibrations present in the vehicle structure can frequently be accomplished through a frequency analysis of the data. For these cases, a Fourier transformation of the data is made prior to entry of the data into a pattern recognition algorithm. Other mathematical transformations are also made for particular pattern recognition purposes in practicing the teachings of this invention. Some of these include shifting and combining data to determine phase changes for example, differentiating the data, filtering the data, and sampling the data. Also, there exist certain more sophisticated mathematical operations that attempt to extract or highlight specific features of the data. This invention contemplates the use of a variety of these preprocessing techniques and the choice of which ones is left to the skill of the practitioner designing a particular diagnostic module.

Another technique that is contemplated for some implementations of this invention is the use of multiple accelerometers and/or microphones that will allow the system to locate the source of any measured vibrations based on the time of flight and/or triangulation techniques. Once a distributed accelerometer installation has been implemented to permit this source location, the same sensors can be used for smarter crash sensing as it will permit the determination of the location of the impact on the vehicle. Once the impact location is known, a highly tailored algorithm can be used to accurately forecast the crash severity making use of a knowledge on the force vs. crush properties of the vehicle at the impact location.

When a vehicle component begins to change its operating behavior, it is not always apparent from the particular sensors, if any, which are monitoring that component. The output from any one of these sensors can be normal even though the component is failing. By analyzing the output of a variety of sensors, however, the pending failure can be diagnosed. For example, the rate of temperature rise in the vehicle coolant, if it were monitored, might appear normal unless it were known that the vehicle was idling and not traveling down a highway at a high speed. Even the level of coolant temperature which is in the normal range could be in fact abnormal in some situations signifying a failing coolant pump, for example, but not detectable from the coolant thermometer alone.

The pending failure of some components is difficult to diagnose and sometimes the design of the component requires modification so that the diagnosis can be more readily made. A fan belt, for example, frequently begins failing by a cracking of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound can then be sensed by a general purpose microphone, for example.

In FIG. 1, a generalized component 100 emitting several signals which are transmitted along a variety of paths, sensed by a variety of sensors and analyzed by the diagnostic device, in accordance with the invention is illustrated schematically. Component 100 is mounted to a vehicle 180 and during operation it emits a variety of signals such as acoustic 101, electromagnetic radiation 102, thermal radiation 103, current and voltage fluctuations in conductor 104 and mechanical vibrations 105. Various sensors are mounted in the vehicle to detect the signals emitted by the component 100. These include one or more vibration sensors (accelerometers) 130,150 and/or gyroscopes also mounted to the vehicle, one or more acoustic sensors 110, 151, electromagnetic radiation sensor 115, heat radiation sensor 120, and voltage or current sensor 140. In addition, various other sensors 152, 153 measure other parameters of other components that in some manner provide information directly or indirectly on the operation of component 100. All of the sensors illustrated on FIG. 1 can be connected to a data bus 160. A diagnostic module 170, in accordance with the invention, can also be attached to the vehicle data bus 160 and receives the signals generated by the various sensors. The sensors may however be wirelessly connected:to the diagnostic module 170 and be integrated into a wireless power and communications system or a combination of wired and wireless connections.

As shown in FIG. 1, the diagnostic module 170 has access to the output data of each of the sensors that have information relative to the component 100. This data appears as a series of numerical values each corresponding to a measured value at a specific point in time. The cumulative data from a particular sensor is called a time series of individual data points. The diagnostic module 170 compares the patterns of data received from each sensor individually, or in combination with data from other sensors, with patterns for which the diagnostic module has been trained to determine whether the component is functioning normally or abnormally.

Central to this invention are the manner in which the diagnostic module 170 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge, Mass., 1990; J. M. Zaruda, *Introduction to Artificial Neural Systems*, West publishing Co., N.Y., 1992 and, *Digital Neural Networks*, by Kung, S. Y., PTR Prentice Hall, Englewood Cliffs, N.J., 1993, all of which are included herein by reference. The neural network pattern recognition technology is one of the most developed of pattern recognition technologies. The neural network will be used here to illustrate one example of a pattern recognition technology but it is emphasized that this invention is not limited to neural networks. Rather, the invention may apply any known pattern recognition technology including sensor fusion and various correlation tehnologies. A brief description of the neural network pattern recognition technology is set forth below.

Neural networks are constructed of processing elements knows as neurons that are interconnected using information channels call interconnects. Each neuron can have multiple inputs but only one output. Each output however is usually connected to all other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out of balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to tire unbalance are also included such as, for example, the vehicle speed or wheel speed. Data is taken from a variety of vehicles where the tires were accurately balanced under a variety of operating conditions also for cases where varying amounts of unbalance was intentionally introduced. Once the data had been collected, some degree of preprocessing or feature extraction is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network-generating program, for example, if a neural network pattern recognition system is to be used. Such programs are available commercially, e.g., from NeuralWare of Pittsburgh, Pa. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, or DSP (herein collectively referred to as a microprocessor or processor). Such a microprocessor appears inside the diagnostic module 170 in FIG. 1. Once trained, the neural network, as represented by the algorithm, will now recognize an unbalanced tire on a vehicle when this event occurs. At that time, when the tire is unbalanced, the diagnostic module 170 will output a message to the driver indicating that the tire should be now be balanced as described in more detail below. The message to the driver is provided by output means coupled to or incorporated within the module 170 and may be, e.g., a light on the dashboard, a vocal tone or any other recognizable indication apparatus.

It is important to note that there may be many neural networks involved in a total vehicle diagnostic system. These can be organized either in parallel, series, as an ensemble, cellular neural network or as a modular neural network system. In one implementation of a modular neural network, a primary neural network identifies that there is an abnormality and tries to identify the likely source. Once a choice has been made as to the likely source of the abnormality, another of a group of neural networks is called upon to determine the exact cause of the abnormality. In this manner, the neural networks are arranged in a tree pattern with each neural network trained to perform a particular pattern recognition task.

Discussions on the operation of a neural network can be found in the above references on the subject and are well understood by those skilled in the art. Neural networks are the most well known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, render these systems impractical for general vehicle diagnostic problems such as described herein. Therefore, preferably the pattern recognition systems that learn by training are used herein.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

Figure 2:
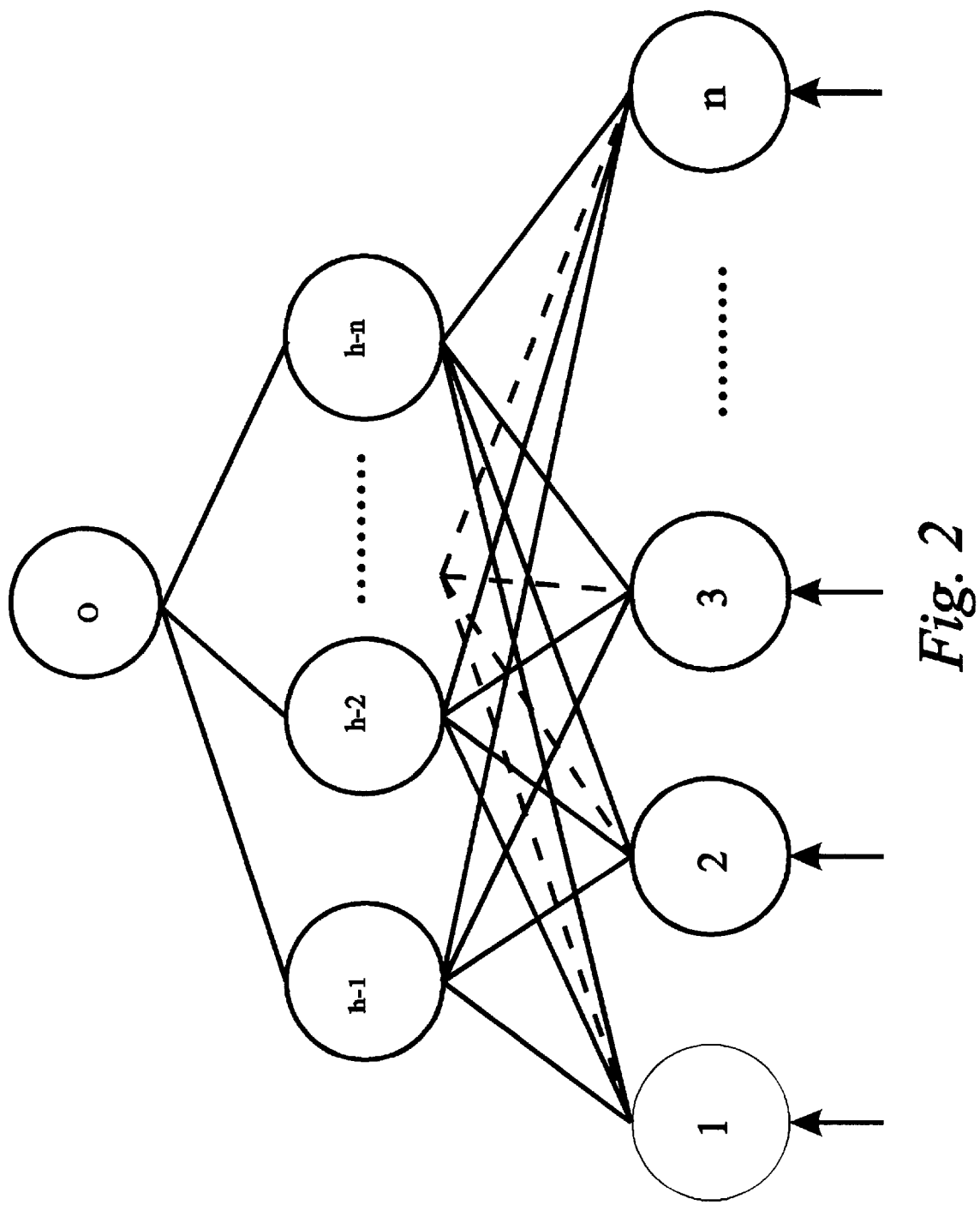
FIG. 2 is a schematic of one pattern recognition methodology known as a neural network which may be used in a method in accordance with the invention.

A diagram of one example of a neural network used for diagnosing an unbalanced tire, for example, based on the teachings of this invention is shown in FIG. 2. The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer for example. the digital acceleration values from the analog to digital converter in the accelerometer are entered into nodes I through n and the neural network algorithm compares the pattern of values on nodes 1 through n with patterns for which it has been trained as follows.

Each of the input nodes is connected to each of the second layer nodes, h-1,h-2, . . . , h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node 0 representing the decision to notify the driver of the unbalanced tire. During the training phase, an output node value of 1, for example, is assigned to indicate that the driver should be notified and a value of 0 is assigned to not doing so. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver and comprises the steps of:

(a) obtaining an acceleration signal from an accelerometer mounted on a vehicle, (b) converting the acceleration signal into a digital time series.

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and;

(h) notifying a driver if the value on one output series node is within a chosen range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor, DSP or in a neural computer. In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 170 contains preprocessing and neural network algorithms for a number of component failures. The neural network algorithms are generally relatively simple, requiring only a few lines of computer code. A single general neural network program can be used for multiple pattern recognition cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus or from other sources, those patterns that predict failure of a particular component.

Figure 3:
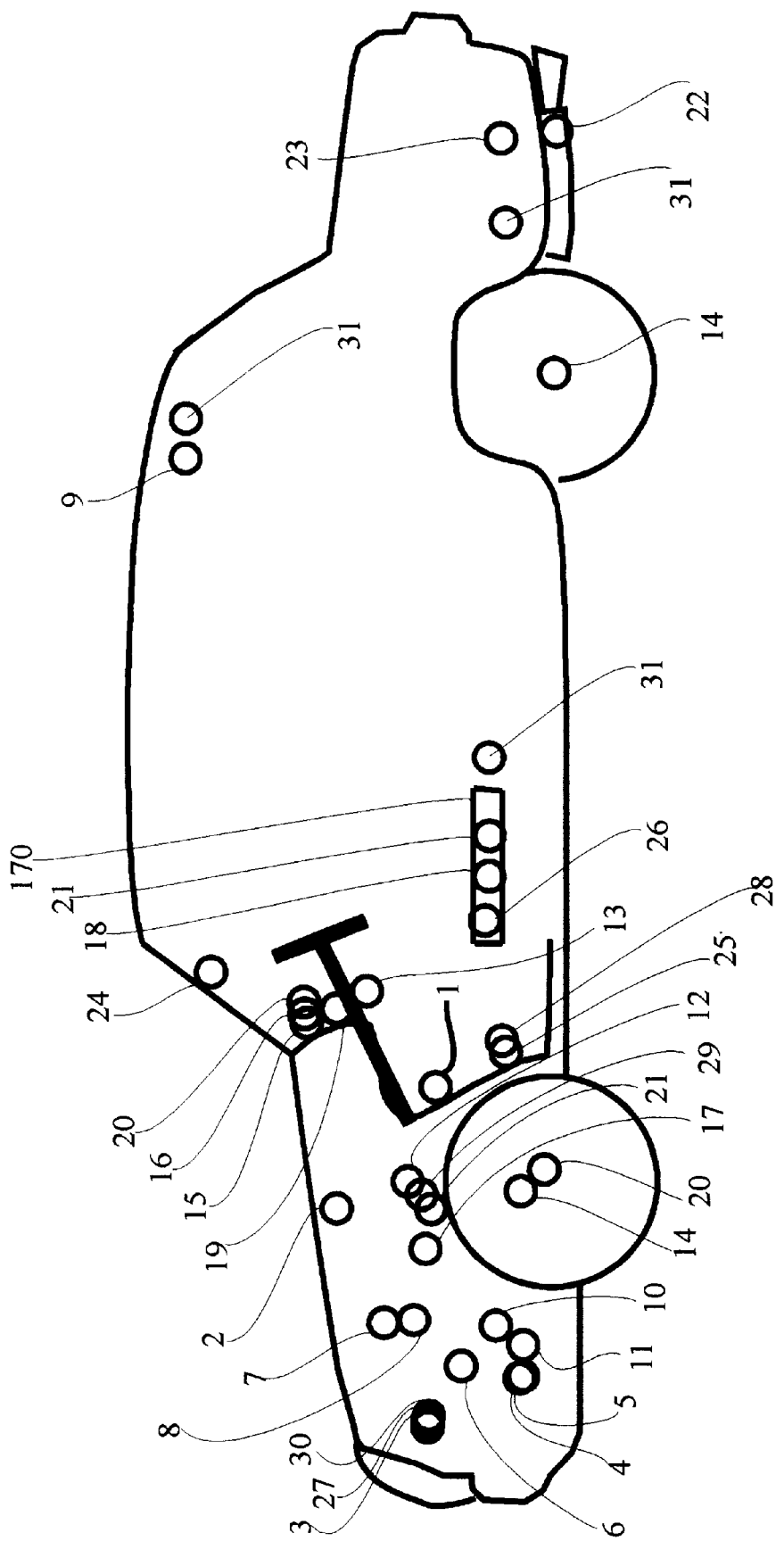
FIG. 3 is a schematic of a vehicle with several components and several sensors and a total vehicle diagnostic system in accordance with the invention utilizing a diagnostic module in accordance with the invention and which may be used in a method in accordance with the invention.
Figure 4:
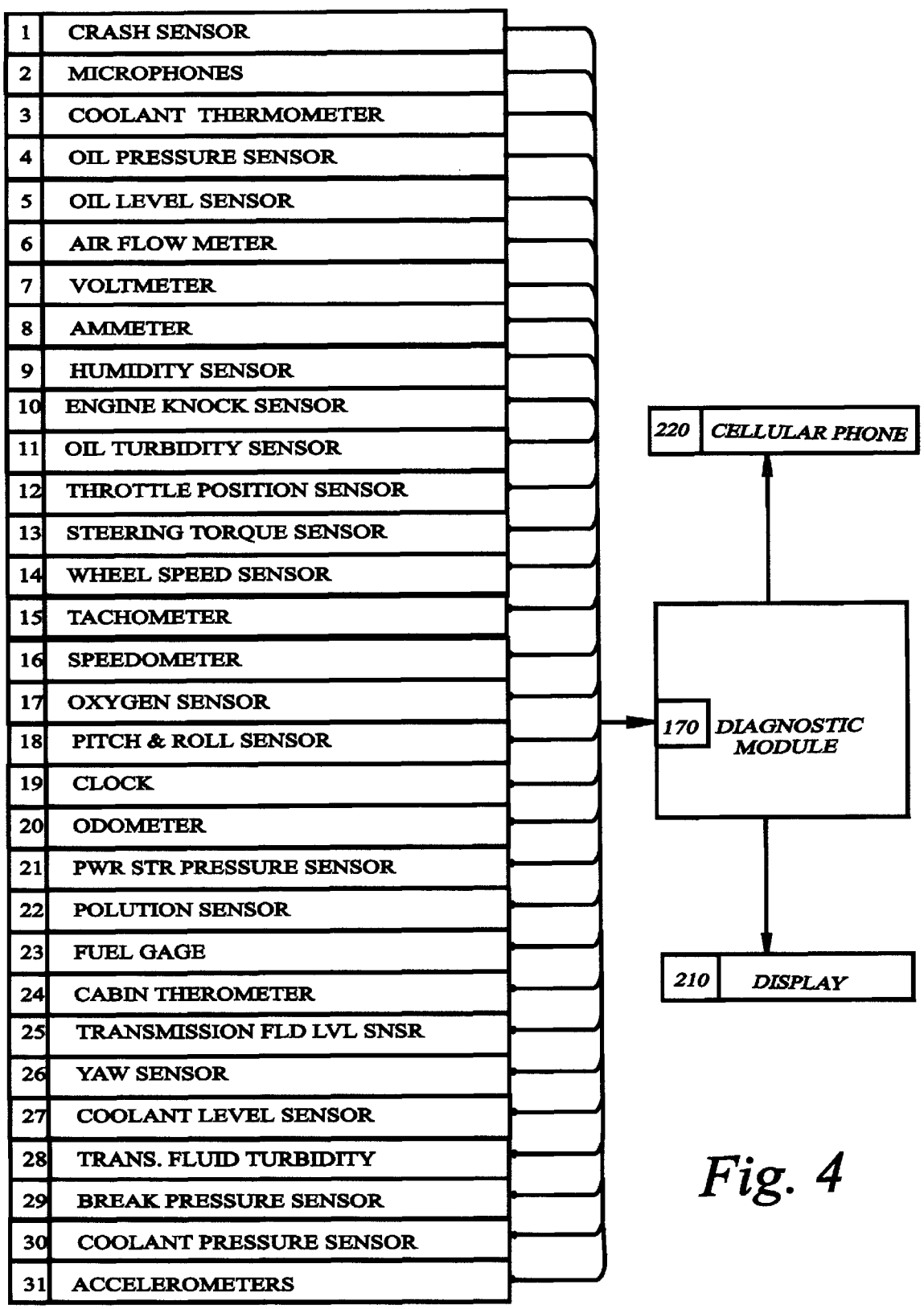
FIG. 4 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

In FIG. 3, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown on FIG. 3 onto the vehicle data bus and thereby into the diagnostic device in accordance with the invention is shown in FIG. 4 along with outputs to a display for notifying the driver and to the vehicle cellular phone, or other communication device, for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 4 also contains the names of the sensors shown numbered on FIG. 3.

Sensor 1 is a crash sensor having an accelerometer (alternately one or more dedicated accelerometers can be used), sensor 2 is represents one or more microphones, sensor 3 is a coolant thermometer, sensor 4 is an oil pressure sensor, sensor 5 is an oil level sensor, sensor 6 is an air flow meter, sensor 7 is a voltmeter, sensor 8 is an ammeter, sensor 9 is a humidity sensor, sensor 10 is an engine knock sensor, sensor 11 is an oil turbidity sensor, sensor 12 is a throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor, sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor 26 is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer. a pressure transducer, a liquid level sensor, a flow meter, a position sensor, a velocity sensor, a RPM sensor, a chemical sensor and an angle sensor, angular rate sensor or Horoscope.

If a distributed group of acceleration sensors or accelerometers are used to permit a determination of the location of a vibration source, the same group can, in some cases, also be used to measure the pitch, yaw and/or roll of the vehicle eliminating the need for dedicated angular rate sensors: In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, roll over sensing etc.

Consider now some examples. The following is a partial list of potential component failures and the sensors from the list on FIG. 4 that might provide information to predict the failure of the component:

| | |
|---|---|
| Out of balance tires | 1, 13, 14, 15, 20, 21 |
| Front end out of alignment | 1, 13, 21, 26 |
| Tune up required | 1, 3, 10, 12, 15, 17, 20, 22 |
| Oil change needed | 3, 4, 5, 11 |
| Motor failure | 1, 2, 3, 4, 5, 6, 10, 12, 15, 17, 22 |
| Low tire pressure | 1, 13, 14, 15, 20, 21 |
| Front end looseness | 1, 13, 16, 21, 26 |
| Cooling system failure | 3, 15, 24, 27, 30 |
| Alternator problems | 1, 2, 7, 8, 15, 19, 20 |
| Transmission problems | 1, 3, 12, 15, 16, 20, 25, 28 |
| Differential problems | 1, 12, 14 |
| Brakes | 1, 2, 14, 18, 20, 26, 29 |
| Catalytic converter and muffler | 1, 2, 12, 15, 22 |
| Ignition | 1, 2, 7, 8, 9, 10, 12, 17, 23 |
| Tire wear | 1, 13, 14, 15, 18, 20, 21, 26 |
| Fuel leakage | 20, 23 |
| Fan belt slippage | 1, 2, 3, 7, 8, 12, 15, 19, 20 |
| Alternator deterioration | 1, 2, 7, 8, 15, 19 |
| Coolant pump failure | 1, 2, 3, 24, 27, 30 |
| Coolant hose failure | 1, 2, 3, 27, 30 |
| Starter failure | 1, 2, 7, 8, 9, 12, 15 |
| Dirty air filter | 2, 3, 6, 11, 12, 17, 22 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed can not be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to this invention as in the combination of several such temporal patterns. Fourth, the vibration measuring capability of the airbag crash sensor, or other accelerometer, is useful for most of the cases discussed above yet there is no such current use of accelerometers. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that. this and other chemical sensors will be used more in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise. it is also possible to provide for a multiplicity of sensors each receiving a different signal related to a specific component which are then analyzed by the processor to determine if that component is operating in an abnormal state. Note that neural networks can simultaneously analyze data from multiple sensors of the same type or different types.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail. As envisioned, on some automobiles, when the diagnostic module 170 detects a potential failure it not only notifies the driver through a display 210, but also automatically notifies the dealer through a vehicle cellular phone 220. The dealer can thus contact the vehicle owner and schedule an appointment to undertake the necessary repair at each party's mutual convenience. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity, thereby conserving electrical energy and maximizing the time and distance that the vehicle can travel before exhausting the energy in the batter. Additionally; this system can be coupled to a system such as OnStar or a vehicle route guidance system, and the driver can be guided to the nearest open repair facility or a facility of his or her choice.

In the discussion above, the diagnostic module of this invention assumes that a vehicle data bus exists which is used by all of the relevant sensors on the vehicle. Most vehicles today do not have a data bus although it is widely believed that most vehicles will have one in the near future. Naturally, the relevant signals can be transmitted to the diagnostic module through a variety of coupling means other than through a data bus and this invention is not limited to vehicles having a data bus. For example, the data can be sent wirelessly to the diagnostic module using the Bluetooth specification. In some cases, even the sensors do not have to be wired and can obtain their power via RF from the interrogator as is well known in the RFID (radio frequency identification) field. Alternately an inductive or capacitive power transfer system can be used.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as test in which two or more components are operating abnormally. In this manner, the diagnostic module may be able to determine based on one set of signals from the sensors during use that either a single component or multiple components are operating abnormally.

Furthermore, the pattern recognition algorithm may be trained based on pattern within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. Note that in some cases, simulations can be used to analytically generate the relevant data.

The invention is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the guidance system of the vehicle. which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway. until the abnormal operation of the component is satisfactorily addressed.

Figure 5:
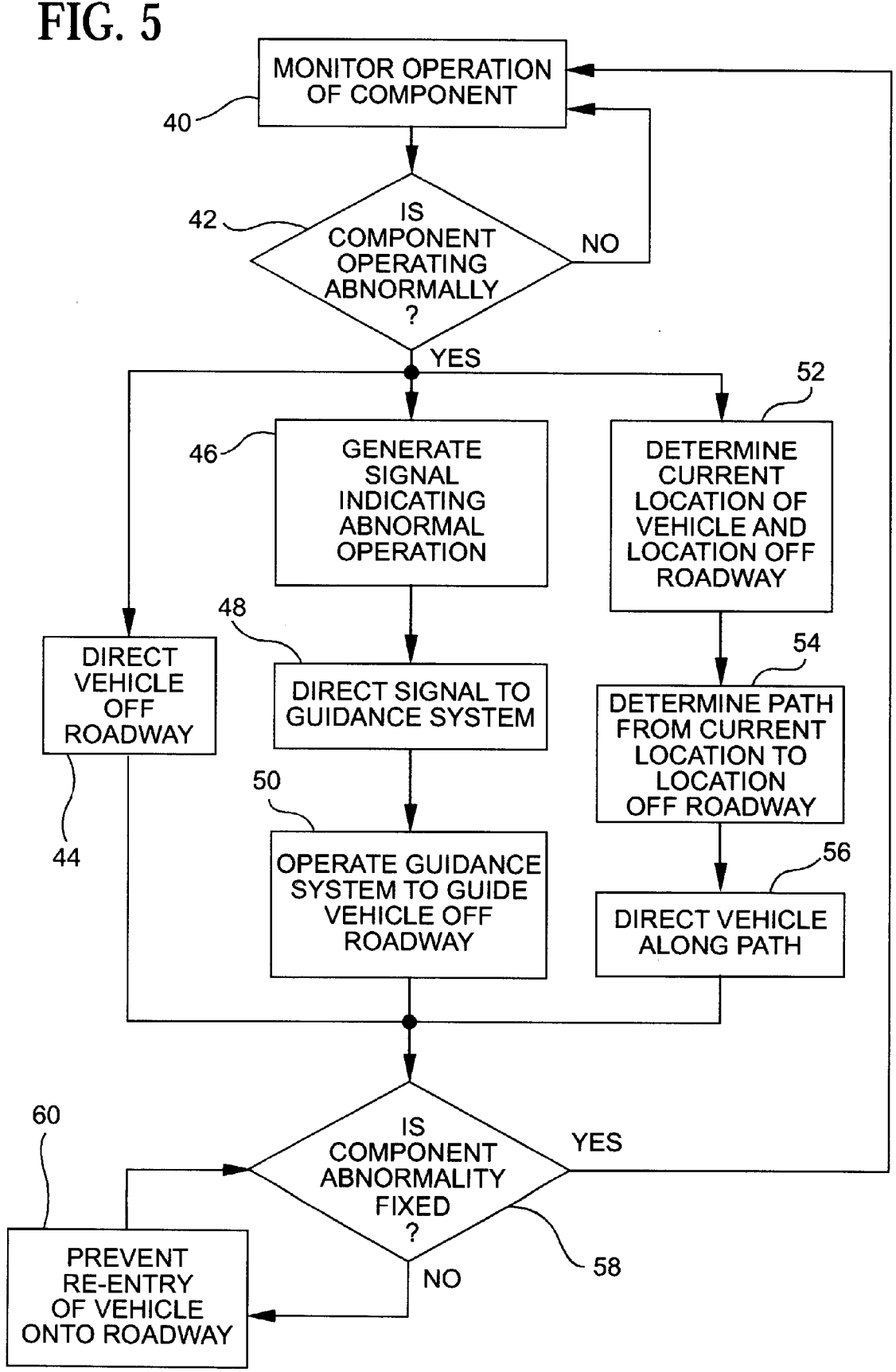
FIG. 5 is a flow chart of the methods for automatically monitoring a vehicular component in accordance with the invention.

FIG. 5 is a flow chart of some of the methods for directing a vehicle off of a roadway if a component is operating abnormally. The component's operation is monitored at 40 and a determination is made at 42 whether its operation is abnormal. If not, the operation of the component is monitored further. If the operation of the component is abnormal, the vehicle can be directed off the roadway at 44. More particularly, this can be accomplished by generating a signal indicating the abnormal operation of the component at 46, directing this signal to a guidance system in the vehicle at 48 that guides movement of the vehicle off of the roadway at 50. Also, if the component is operating abnormally, the current position of the vehicle and the location of a site off of the roadway can be determined at 52, e.g., using satellite-based or ground-based location determining techniques, a path from the current location to the off-roadway location determined at 54 and then the vehicle directed along this path at 56. Periodically, a determination is made at 58 whether the component's abnormality has been satisfactorily addressed and/or corrected and if so, the vehicle can re-enter the roadway and operation of the component begins again. If not, the re-entry of the vehicle onto the roadway is prevented at 60.

Figure 6:
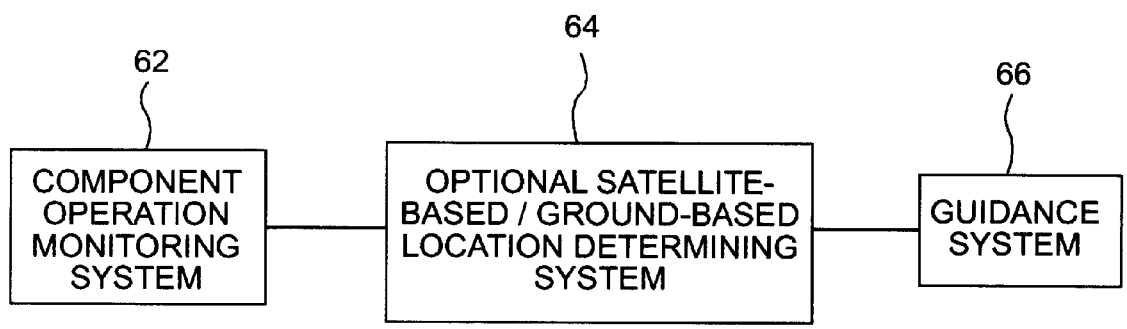
FIG. 6 is a schematic illustration of the components used in the methods for automatically monitoring a vehicular component.

FIG. 6 schematically shows the basic components for performing this method, i.e., a component operation monitoring system 62 (such as described above), an optional satellite-based or ground-based positioning system 64 and a vehicle guidance system 66.

Figure 7:
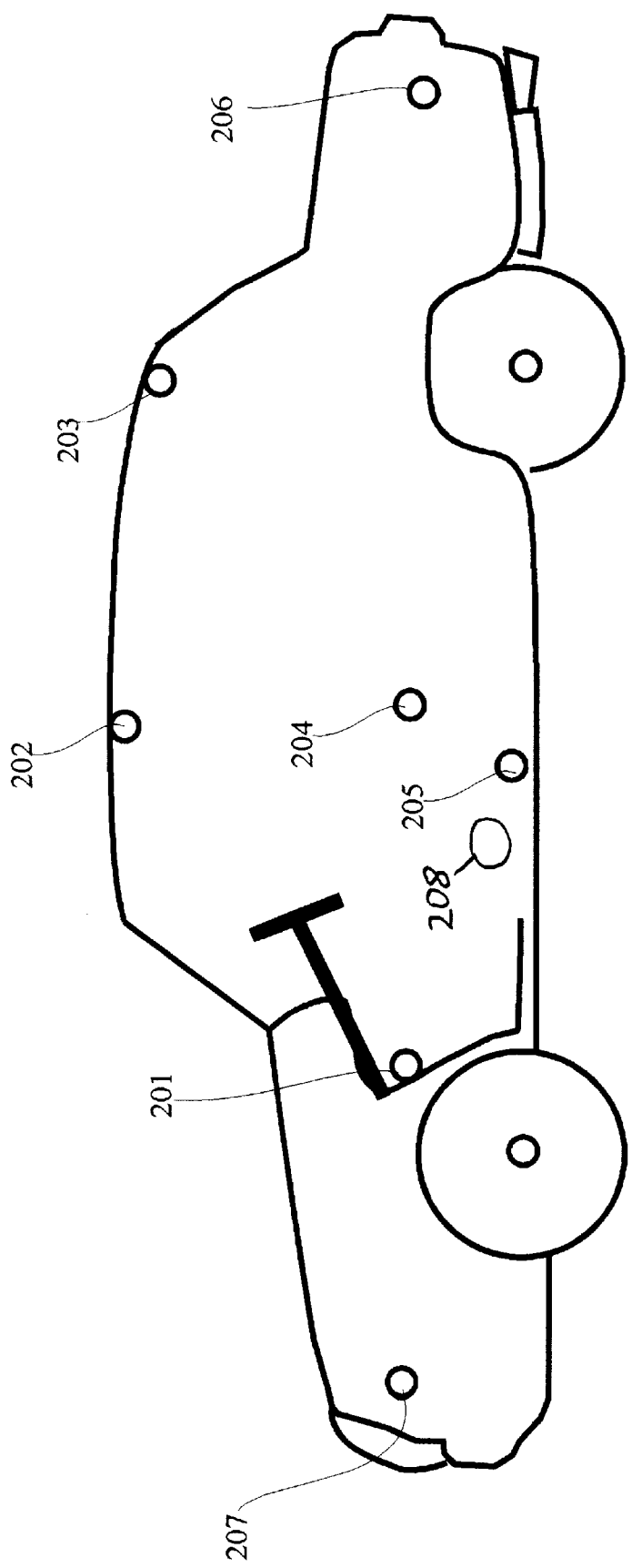
FIG. 7 is a schematic of a vehicle with several accelerometers and/or gyroscopes at preferred locations in the vehicle.

FIG. 7 illustrates the placement of a variety of sensors, primarily accelerometers and/or gyroscopes, which can be used to diagnose the state of the vehicle itself Sensor 201 can measure the acceleration of the firewall or instrument panel and is located thereon generally midway between the two sides of the vehicle. Sensor 202 can be located in the headliner or attached to the vehicle roof above the side door. Typically, there will be two such sensors one on either side of the vehicle. Sensor 203 is shown in a typical mounting location midway between the sides of the vehicle attached to or near the vehicle roof above the rear window. Sensor 206 is shown in a typical mounting location in the vehicle trunk adjacent the rear of the vehicle. Either one, two or three such sensors can be used depending on the application. If three such sensors are use one would be adjacent each side of vehicle and one in the center. Sensor 204 is shown in a typical mounting location in the vehicle door and sensor 205 is shown in a typical mounting location on the sill or floor below the door. Finally, sensor 207, which can be also multiple sensors, is shown in a typical mounting location forward in the crush zone of the vehicle. If three such sensors are used, one would be adjacent each vehicle side and one in the center.

In general, sensors 201–207 provide a measurement of the state of the sensor, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 201–207 above is merely exemplary and is not intended to limit the form of the sensor or its function.

Each of the sensors 201–207 may be single axis, double axis or triaxial accelerometers and/or gyroscopes typically of the MEMS type. These sensors 201–207 can either be wired to the central control module or processor directly wherein they would receive power and transmit information, or they could be connected onto the vehicle bus or, in some cases, using RFID technology, the sensors can be wireless and would receive their power through RF from one or more interrogators located in the vehicle. In this case, the interrogators can be connected either to the vehicle bus or directly to control module. Alternately, an inductive or capacitive power and information transfer system can be used.

One particular implementation will now be described. In this case, each of the sensors 201–207 is a single or dual axis accelerometer. They are made using silicon micromachined technology such as disclosed in U.S. Pat. Nos. 5,121,180 and 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

The angular rate function can be obtained through placing accelerometers at two separated, non-co-located points in a vehicle and using the differential acceleration to obtain an indication of angular motion and angular acceleration. From the variety of accelerometers shown on FIG. 7, it can be readily appreciated that not only will all accelerations of key parts of the vehicle be determined; but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes.

Instead of using two accelerometers are separate locations on the vehicle, a single conformal MEMS-IDT gyroscope may be used. Such a conformal MEMS-IDT gyroscope is describes in a paper by V. K. Karadan, Conformal MEMS-IDT Gyroscopes and Their-Comparison With Fiber Optic Gyro, incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures.

The system of FIG. 7 using dual axis accelerometers, therefore provide a complete diagnostic system of the vehicle itself and its dynamic motion. Such a system is far more accurate than any system currently available in the automotive market. This system provides very accurate crash discrimination since the exact location of the crash can be determined and, coupled with a knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers at a variety of locations in the vehicle, significant improvements are many in the vehicle stability control, crash sensing, rollover sensing, and resulting occupant. protection technologies.

Finally, as mentioned above, the combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 7 and simultaneously the dynamic strain gage measurements from seat mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, sensor 208 represents one or more strain gage weight sensors mounted on the seat or in connection with the seat or its support structure. Suitable mounting locations and forms of weight sensors are discussed in the current assignee's U.S. patent application Ser. No. 09/193,209 and contemplated for use in this invention as well. The mass or weight of the occupying item of the seat can thus be measured based on the dynamic measurement of the strain gages with optional consideration of the measurements of accelerometers on the vehicle, which are represented by any of sensors 201–207.

Thus, discussed above is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, processor means coupled to the sensors for receiving and processing the electrical signals and for determining if the component is operating abnormally based on the electrical signals, and output means coupled to the processor means for affecting another system within the vehicle if the component is operating abnormally. The processor means preferably comprise-pattern recognition means such as a trained pattern recognition algorithm, a neural network, modular neural networks or an ensemble of neural networks. In some cases, fuzzy logic will be used which can be combined with a neural network to form a neural fuzzy algorithm. The another system may be a display for indicating the abnormal state of operation of the component arranged in a position in the vehicle to enable a driver of the vehicle to view the display and thus the indicated abnormal operation of the component. At least one source of additional information, e.g., the time and date, may be provided and input means coupled to the vehicle for inputting the additional information into the processor means. The another system may also be a warning device including transmission means for transmitting information related to the component abnormal operating state to a site remote from the vehicle, e.g., a vehicle repair facility.

In another embodiment of the component diagnostic system discussed above, at least one sensor detects a signal containing information as to whether the component is operating normally or abnormally and outputs a corresponding electrical signal. Processor means are coupled to the sensor(s) for receiving and processing the electrical signal(s) and for determining if the component is operating abnormally based thereon. The processor means preferably comprise a pattern recognition algorithm for analyzing a pattern within the signal detected by each sensor. Output means are coupled to the processor means for affecting another system within the vehicle if the component is operating abnormally. The another system may be a display as mentioned above or a warning device.

A method for automatically monitoring one or more components of a vehicle during operation of the vehicle on a roadway entails, as discussed above, the steps of monitoring operation of the component in order to detect abnormal operation of the component, e.g., in one or the ways described above, and if abnormal operation of the component is detected, automatically directing the vehicle off of the restricted roadway. For example, in order to automatically direct the vehicle off of the restricted roadway, a signal representative of the abnormal operation of the component may be generated and directed to a guidance system of the vehicle that guides the movement of the vehicle. Possibly the directing the vehicle off of the restricted roadway may entail applying satellite positioning techniques or ground-based positioning techniques to enable the current position of the vehicle to be determined and a location off of the restricted highway to be determined and thus a path for the movement of the vehicle. Re-entry of the vehicle onto the restricted roadway may be prevented until the abnormal operation of the component is satisfactorily addressed.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. Also, any of the apparatus and methods disclosed herein may be used for diagnosing the state of operation or a plurality of discrete components. This invention is not limited to the above embodiments and should be determined by the following claims.

What is claimed is:

1. In a motor vehicle, a control system for controlling at least one part of the vehicle comprising:

a plurality of sensor systems mounted at different locations on the vehicle, each of said sensor systems providing a measurement related to a state of said sensor system or a measurement related to a state of the mounting location; and a processor coupled to said sensor systems and arranged to diagnose the state of the vehicle based on the measurements of said sensor systems, said processor being arranged to control the at least one part based at least in part on the diagnosed state of the vehicle.

2. The vehicle of claim 1, wherein at least one of said sensor systems is a sensor selected from a group consisting of a single axis acceleration sensor, a double axis acceleration sensor, a triaxial acceleration sensor and a gyroscope.

3. The vehicle of claim 1, wherein at least one of said sensor systems includes an RFID response unit, further comprising at least one RFID interrogator device, said at least one interrogator device causing said RFID response units of said at least one sensor system to transmit a signal representative of the measurement of said at least one sensor system to said processor.

4. The vehicle of claim 1, wherein the state of the vehicle diagnosed by said processor includes angular motion of the vehicle.

5. The vehicle of claim 4, wherein the at least one part is a system selected from a group consisting of a steering system, a braking system or a throttle system, said processor being arranged to control the system in an attempt to maintain stability of the vehicle.

6. The vehicle of claim 5, wherein the at least one part is an occupant restraint device, said processor being arranged to control the occupant restraint device in an attempt to minimize injury to an occupant.

7. The vehicle of claim 1, wherein the state of the vehicle diagnosed by said processor includes a determination of a location of an impact between the vehicle and another object.

8. The vehicle of claim 7, wherein the at least one part is an occupant restraint device, said processor being arranged to forecast the severity of the impact using the force/crush properties of the vehicle at the impact location and control the occupant restraint device based at least in part on the severity of the impact.

9. The vehicle of claim 1, wherein the at least one part is an occupant restraint device.

10. The vehicle of claim 9, further comprising a weight sensing system coupled to a seat in the vehicle for sensing the weight of an occupying item of the seat, said weight sensing system being coupled to said processor and said processor controlling the occupant restraint device based on the state of the vehicle and the weight of the occupying item of the seat sensed by said weight sensing system.

11. The vehicle of claim 1, wherein said processor includes pattern recognition means for diagnosing the state of the vehicle.

12. The vehicle of claim 1, further comprising a display coupled to said processor for displaying an indication of the state of the vehicle as diagnosed by said processor.

13. The vehicle of claim 1, further comprising a warning device coupled to said processor for relaying a warning to an occupant of the vehicle relating to the state of the vehicle as diagnosed by said processor.

14. The vehicle of claim 1, further comprising a transmission device coupled to said processor for transmitting a signal to a remote site relating to the state of the vehicle as diagnosed by said processor.

15. The vehicle of claim 1, wherein the state of the vehicle includes angular acceleration, a plurality of said sensor systems comprising accelerometers such that said processor determines the angular acceleration of the vehicle based on the acceleration measured by said accelerometers.

16. The vehicle of claim 1, wherein at least one of said sensor systems comprises a high dynamic range accelerometer.

17. The vehicle of claim 1, wherein at least one of said sensors comprises a gyroscope including a surface acoustic wave resonator which applies standing waves on a piezoelectric substrate.

18. The vehicle of claim 1, wherein the state of the vehicle diagnosed by said processor includes angular acceleration of the vehicle whereby angular velocity and angular position or orientation are derivable from the angular acceleration the at least one part being a navigation system, said processor being arranged to control said navigation system based on the angular acceleration of the vehicle.

19. A method for controlling at least one part of the vehicle comprising the steps of mounting a plurality of sensor systems at different locations on the vehicle;
    measuring a state of the sensor system or a state of the respective mounting location of the sensor system;
    diagnosing the state of the vehicle based on the measurements of the state of the sensor systems or the state of the mounting locations of the sensor systems, and
    controlling the at least one part based at least in part on the diagnosed state of the vehicle.

20. The method of claim 19, wherein the state of the sensor system is the acceleration, angular acceleration, angular velocity or angular orientation of the sensor system.

21. The method of claim 19, wherein the state of the vehicle is diagnosed by a processor, further comprising the steps of:
    providing at least one of the sensor systems with an RFID response unit;
    mounting at least one RFID interrogator device on the vehicle; and
    transmitting signals via the at least one RFID interrogator device to cause the RFID response units of the at least one sensor system to transmit a signal representative of the measurements of the at least one sensor system to the processor.

22. The method of claim 19, wherein the step of diagnosing the state of the vehicle comprises the step of determining whether the vehicle is stable or is about to rollover or skid.

23. The method of claim 19, wherein the at least one part is a system selected from a group consisting of a steering system, a braking system or a throttle system, the step of controlling the at least one part comprising the step of controlling the system in an attempt to maintain stability of the vehicle.

24. The method of claim 19, wherein the at least one part is an occupant restraint device, the step of controlling the at least one part comprising the steps of controlling the system in an attempt to minimize injury to an occupant in the event of a crash.

25. The method of claim 19, wherein the step of diagnosing the state of the vehicle comprises the step of determining a location of an impact between the vehicle and another object.

26. The method of claim 25, wherein the at least one part is an occupant restraint device, further comprising the step of forecasting the severity of the impact using the force/crush properties of the vehicle at the impact location, the step of controlling the at least one part comprising the step of controlling the occupant restraint device based at least in part on the severity of the impact.

27. The method of claim 19, wherein the at least one part is an occupant restraint device, further comprising the step of sensing the weight of an occupying item of a seat of the vehicle, the step of controlling the at least one part comprising the step of controlling the occupant restraint device based at least in part on the weight of the occupying item of the scat.

28. The method of claim 19, further comprising the step of displaying an indication of the state of the vehicle.

29. The method of claim 19, further comprising the step of relaying a warning to an occupant of the vehicle relating to the state of the vehicle.

30. The method of claim 19, further comprising the step of transmitting a signal to a remote site relating to the state of the vehicle.

31. The method of claim 19, wherein a plurality of the sensor systems comprises accelerometers, the step of diagnosing the state of the vehicle comprises the step of determining angular acceleration of the vehicle based on the acceleration measured by said accelerometers.

32. The method of claim 19, wherein the step of diagnosing the state of the vehicle comprises the step of determining angular acceleration of the vehicle whereby angular velocity and angular position or orientation are derivable from the angular acceleration, the at least one part being a navigation system, the step of controlling the at least one part comprising the controlling the navigation system based on the angular acceleration of the vehicle.

33. In a motor vehicle, a control system for controlling at least one part of the vehicle comprising:
    a plurality of sensor systems mounted on the vehicle, each of said sensor systems providing a measurement of a state of said sensor system or a state of the mounting location of said sensor system and generating a signal representative of the measurement; and
    a pattern recognition system for receiving the signals from said sensor systems and diagnosing the state of the vehicle based on the measurements of said sensor systems,
    said pattern recognition system being arranged to generate a control signal for controlling the at least one part based at least in part on the diagnosed state of the vehicle.

34. The vehicle of claim 33, wherein said pattern recognition system comprises at least one neural network.

35. The vehicle of claim 33, wherein at least one of said sensor systems is a sensor selected from a group consisting of a single axis acceleration sensor, a double axis acceleration sensor, a triaxial acceleration sensor and a gyroscope.

36. The vehicle of claim 33, wherein the state of the vehicle diagnosed by said processor includes angular orientation, velocity or acceleration of the vehicle.

37. The vehicle of claim 33, wherein the at least one part is a system selected from a group consisting of a steering system, a braking system or a throttle system, said processor being arranged to control the system in an attempt to maintain stability of the vehicle.

38. The vehicle of claim 33, wherein the at least one part is an occupant restraint device, said processor being arranged to control the occupant restraint device in an attempt to minimize injury to an occupant.

39. The vehicle of claim 33, wherein the state of the vehicle diagnosed by said pattern recognition system includes a determination of a location on the vehicle of an impact between the vehicle and another object.

40. The vehicle of claim 39, wherein the at least one part is an occupant restraint device, said pattern recognition system being arranged to forecast the severity of the impact using the force/crush properties of the vehicle at the impact location and generate the control signal for controlling the occupant restraint device based at least in part on the severity of the impact.

41. The vehicle of claim 33, wherein the at least one part is an occupant restraint device, further comprising a weight sensing system coupled to a seat in the vehicle for sensing the weight of an occupying item of the seat, said pattern recognition system generating the control signal for controlling the occupant restraint device based on the state of the vehicle and the weight of the occupying item of the seat sensed by said weight sensing system.

42. The vehicle of claim 33, further comprising a warning device for relaying a warning to an occupant of the vehicle relating to the state of the vehicle as diagnosed by said pattern recognition system.

43. The vehicle of claim 33, further comprising a transmission device for transmitting a signal to a remote site relating to the state of the vehicle as diagnosed by said pattern recognition system.

44. The vehicle of claim 33, wherein the state of the vehicle diagnosed by said pattern recognition system includes a state of an abnormally operating component, said pattern recognition system being arranged to identify a potentially malfunctioning component based on the state of the component measured by said sensor systems and determine whether the identified component is operating abnormally based on the state of the component measured by said sensor systems.

45. The vehicle of claim 33, wherein said pattern recognition system comprises a neural network system and the state of the vehicle diagnosed by said neural network system includes a state of an abnormally operating component, said neural network system including a first neural network arranged to identify a potentially malfunctioning component based on the state of the component measured by said sensor systems and a second neural network for determining whether the identified component is operating abnormally based on the state of the component measured by said sensor systems.

46. The method of claim 33, wherein said pattern recognition system comprises a neural network system and the state of the vehicle diagnosed by said neural network system includes a state of an abnormally operating component, said neural network system including a first neural network arranged to identify a potentially malfunctioning component based on the state of the component measured by said sensor systems and a plurality of additional neural networks, each being trained to determine whether a specific component is operating abnormally, whereby the measurements of the state of the component from said sensor systems are input into that one of the additional neural networks trained on a component which is substantially identical to the identified component.

47. The vehicle of claim 33, wherein said sensor systems are mounted at different locations on the vehicle.

48. A method for controlling at least one part of the vehicle, comprising the steps of:
   mounting a plurality of sensor systems on the vehicle;
   measuring a state of the sensor system or a state of the respective mounting location of the sensor system;
   generating signals representative of the measurements of the sensor systems;
   inputting the signals into a pattern recognition system to obtain a diagnosis of the state of the vehicle; and
   controlling the at least one part based at least in part on the diagnosis of the state of the vehicle.

49. The method of claim 48, wherein the pattern recognition system comprises at least one neural network.

50. The method of claim 48, wherein the diagnosis of the state of the vehicle includes the angular orientation, angular velocity or angular acceleration of the vehicle.

51. The method of claim 48, wherein the at least one part is a system selected from a group consisting of a steering system, a braking system or a throttle system, the step of controlling the at least one part comprising the step of controlling the system in an attempt to maintain stability of the vehicle.

52. The method of claim 48, wherein the at least one part is an occupant restraint device, the step of controlling the at least one part comprising the steps of controlling the system in an attempt to minimize injury to an occupant in the event of a crash.

53. The method of claim 48, wherein the diagnosis of the state of the vehicle includes a determination of a location on the vehicle of an impact between the vehicle and another object.

54. The method of claim 53, wherein the at least one part is an occupant restraint device, further comprising the step of forecasting the severity of the impact using the force/crush properties of the vehicle at the impact location and generating control signals by the pattern recognition system for controlling the occupant restraint device based at least in part on the severity of the impact.

55. The method of claim 48, wherein the at least one part is an occupant restraint device, further comprising the steps of:
   sensing the weight of an occupying item of a seat of the vehicle; and
   generating control signals by the pattern recognition system for controlling the occupant restraint device based on the diagnosis of the state of the vehicle and the weight of the occupying item of the seat.

56. The method of claim 48, further comprising the steps of:
   identifying by means of the pattern recognition system a potentially malfunctioning component based on the states measured by the sensor systems; and determining by means of the pattern recognition system whether the identified component is operating abnormally based on the states measured by the sensor systems.

57. The method of claim 56, wherein the pattern recognition system comprises a neural network system, the step of identifying the potentially malfunctioning component comprises the step of inputting the states measured by the sensor systems into a first neural network of the neural network system and the step of determining whether the identified component is operating abnormally comprises the step of inputting the states measured by the sensor systems into a second neural network of the neural network system.

58. The method of claim 56, wherein the pattern recognition system comprises a neural network system, the step of identifying the potentially malfunctioning component comprises the step of inputting the states measured by the sensor systems into a first neural network of the neural network system and the step of determining whether the identified component is operating abnormally comprises the steps of providing a plurality of additional neural networks of the neural network system, each being trained to determine whether a specific component is operating abnormally, and inputting the states measured by the sensor systems into that one of the additional neural networks trained on a component which is substantially identical to the identified component.

59. The method of claim 48, further comprising the step of mounting the sensors at different locations on the vehicle.

60. In a motor vehicle having a seat, a control system for controlling at least one part of the vehicle based on occupancy of the seat, comprising:

a plurality of strain gages mounted in connection with the seat, each of said strain gages measuring strain of a respective mounting location caused by occupancy of the seat, and a processor coupled to said strain gages and arranged to determine the weight of an occupying item based on the strain measurements from said strain gages over a period of time, said processor being arranged to control the at least one part based at least in part on the determined weight of the occupying item of the seat.

61. The vehicle of claim 60, wherein said processor is arranged to determine motion of the occupying item of the seat based on the strain measurements from said strain gages over the period of time.

62. The vehicle of claim 60, further comprising at least one accelerometer mounted on the vehicle for measuring acceleration, said processor being arranged to control the at least one part based at least in part on the determined weight of the occupying item of the seat and the acceleration measured by said at least one accelerometer.

* * * * *

(12) EX PARTE REEXAMINATION CERTIFICATE (6382nd)
United States Patent
Breed

(10) Number: US 6,484,080 C1
(45) Certificate Issued: *Aug. 19, 2008

(54) METHOD AND APPARATUS FOR CONTROLLING A VEHICULAR COMPONENT

(75) Inventor: David S. Breed, Boonton Township, Morris County, NJ (US)

(73) Assignee: Automotive Technologies International, Inc., Denville, NJ (US)

Reexamination Request:
No. 90/008,346, Nov. 27, 2006

Reexamination Certificate for:
Patent No.: 6,484,080
Issued: Nov. 19, 2002
Appl. No.: 09/753,186
Filed: Jan. 2, 2001

(*) Notice: This patent is subject to a terminal disclaimer.

Related U.S. Application Data

(63) Continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,890,437.
(60) Provisional application No. 60/231,378, filed on Sep. 8, 2000.

(51) Int. Cl.
*G06F 7/00* (2006.01)

(52) U.S. Cl. ............................. 701/36; 701/29; 701/34

(58) Field of Classification Search ........................ None
See application file for complete search history.

(56) References Cited

U.S. PATENT DOCUMENTS

| | | |
|---|---|---|
| 2,333,160 A | 11/1943 | Dunn |
| 3,275,975 A | 9/1966 | King |
| 5,041,976 A | 8/1991 | Marko et al. |
| 5,071,160 A | 12/1991 | White et al. |
| 5,118,134 A | 6/1992 | Mattes et al. |
| 5,161,820 A | 11/1992 | Vollmer |
| 5,173,614 A | 12/1992 | Woehrl et al. |
| 5,202,831 A | 4/1993 | Blackburn et al. |
| 5,219,413 A | 6/1993 | Lineberger |
| 5,222,761 A | 6/1993 | Kaji et al. |
| 5,232,243 A | 8/1993 | Blackburn et al. |
| 5,366,241 A | 11/1994 | Kithil |
| 5,413,378 A | 5/1995 | Steffens, Jr. et al. |
| 5,446,661 A | 8/1995 | Gioutsos et al. |
| 5,454,591 A | 10/1995 | Mazur et al. |
| 5,481,906 A | 1/1996 | Nagayoshi et al. |
| 5,482,314 A | 1/1996 | Corrado et al. |
| 5,494,311 A | 2/1996 | Blackburn et al. |
| 5,573,269 A | 11/1996 | Gentry et al. |
| 5,585,775 A | 12/1996 | Ishishita |
| 5,602,425 A | 2/1997 | Wilhelmi et al. |
| 5,602,734 A | 2/1997 | Kithil |
| 5,605,348 A | 2/1997 | Blackburn et al. |
| 5,612,876 A | 3/1997 | Zeidler et al. |

(Continued)

OTHER PUBLICATIONS

Abstract of German Patent Publication No. DE 3212618.
Abstract of German Patent Publication No. DE 3248222.
Abstract of German Patent Publication No. DE 3802159.

(Continued)

*Primary Examiner*—Joseph A. Kaufman

(57) ABSTRACT

Control system and method for controlling a part of the vehicle in which sensor systems are mounted at different locations on the vehicle, each sensor system providing a measurement related to a state of the sensor system or a measurement related to a state of the mounting location. A processor coupled to the sensor systems diagnoses the state of the vehicle based on the measurements of the sensor system, e.g., by the application of a pattern recognition technique. The processor controls the part based at least in part on the diagnosed state of the vehicle. At least one of the sensor systems may be a high dynamic range accelerometer or a sensor selected from a group consisting of a single axis acceleration sensor, a double axis acceleration sensor, a tri-axial acceleration sensor and a gyroscope, and may optionally include an RFID response unit.

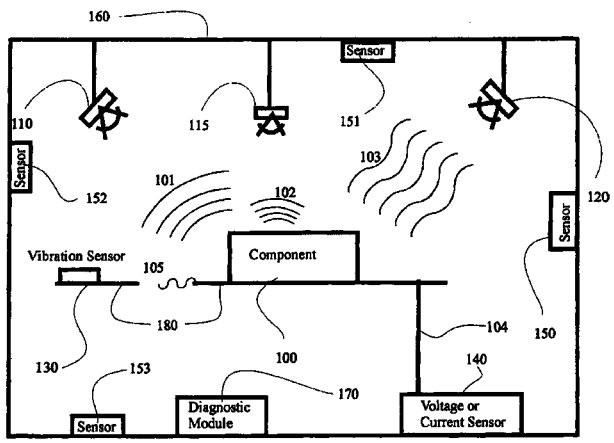

U.S. PATENT DOCUMENTS

| | | | |
|---|---|---|---|
| 5,624,132 | A | 4/1997 | Blackburn et al. |
| 5,653,462 | A | 8/1997 | Breed et al. |
| 5,683,103 | A | 11/1997 | Blackburn et al. |
| 5,684,460 | A | 11/1997 | Scanlon |
| 5,691,693 | A | 11/1997 | Kithil |
| 5,722,686 | A | 3/1998 | Blackburn et al. |
| 5,767,766 | A | 6/1998 | Kwun |
| 5,802,479 | A | 9/1998 | Kithil et al. |
| 5,844,486 | A | 12/1998 | Kithil et al. |
| 5,890,085 | A | 3/1999 | Corrado et al. |
| 5,901,978 | A | 5/1999 | Breed et al. |
| 5,943,295 | A | 8/1999 | Varga et al. |
| 5,948,031 | A | 9/1999 | Jinno et al. |
| 6,014,602 | A | 1/2000 | Kithil et al. |
| 6,015,163 | A | 1/2000 | Langford et al. |
| 6,018,693 | A | 1/2000 | Blackburn et al. |
| 6,088,640 | A | 7/2000 | Breed |
| 6,397,677 | B1 | 6/2002 | Kinsley et al. |

OTHER PUBLICATIONS

Abstract of German Patent Publication No. DE 3809074.
Abstract of German Patent Publication No. DE 3836712.
Abstract of German Patent Publication No. DE 4023109.
Abstract of German Patent Publication No. DE 4115202.
Abstract of German Patent Publication No. DE 4133237.
Abstract of German Patent Publication No. DE 4237072.
Abstract of German Patent Publication No. DE 19530092.
Abstract of German Patent Publication No. DE 19706623.
Abstract of Japanese Patent Publication No. JP 2-293234.
Description of German Patent Publication No. DE 8706578.
Description of German Patent Publication No. DE 9011378.
A Critique of Single Point Crash Sensing, David S. Breed et al., SAE Paper No. 920124.
Trends in Sensing Frontal Impacts, David S. Breed et al., SAE Paper No. 890750.
Vehicle Occupant Position Sensing, David S. Breed et al., SAE Paper No. 940527.
Mechanical Versus Accelerometer Based Sensing for Supplemental Inflatable Restraint Systems, Tony D. Hendrix et al, AES Paper No. 901121, pp. 13–22.
Electronic Crash Sensors for Restraint Systems, Dietrich E. Bergfried et al., Paper No. 901136, pp. 169–177.
Airbag Systems—Their Permanent Monitoring and Its Meaning to the User, Alfons Hartl et al., Siemens Automotive, Paper No. 901138, pp. 187–193.
Using Seat Mounted Accelerometers to Differentiate Between Normally Seated Passengers and Infants in Infant Seats, Alan L. Browne et al., GM R&D, Paper No. 933092, pp. 147–162.
The Use of Signal Processing Techniques in an Occupant Detection System, Edward J. Gillis et al., Automotive Systems, Paper No. 940906, pp. 65–70.
The BMW Seat Occupancy Monitoring System: A Step Towards Situation Appropriate Airbag Deployment, Klaus Kompass et al., SAE Paper No. 960226, pp. 17–25.
The New Generation of the BMW Child Seat and Occupant Detection System SBE 2, Yan Lu et al., Int'l Journal of Automotive Technology, vol. 3, No. 2, pp. 53–56.
Injury Reduction Potential for "Smart" Airbags, Steven R. Fredin, $39^{th}$ Annual Proceedings Association for the Advancement of Automotive Medicine, Oct. 16–18, 1995, pp. 557–565.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19, 20, 22, 24–29, 31, 33–35, 39–42, 44, 47–49, 53–56 and 59 is confirmed.

Claims 1, 4, 7, 10–15, 18, 36-38, 46, 52, and 60 are determined to be patentable as amended.

Claims 2, 6, 8, 9, 61 and 62, dependent on an amended claim, are determined to be patentable.

New claims 63–75 are added and determined to be patentable.

Claims 3, 5, 16, 17, 21, 23, 30, 32, 43, 45, 50, 51, 57 and 58 were not reexamined.

1. In a motor vehicle, a control system for controlling at least one part of the vehicle comprising:
   a plurality of *different* sensor systems mounted at different locations on the vehicle, each of said sensor systems providing a measurement related to a state of said sensor system or a measurement related to a state of the mounting location; and
   a processor coupled to said sensor systems and arranged to diagnose the [state] *overall condition* of the vehicle based on the measurements of said sensor systems, *the diagnosis of the overall condition of the vehicle being a diagnosis of the condition of the vehicle with respect to its stability,*
   said processor being arranged to control the at least one part based at least in part on the diagnosed [state] *overall condition* of the vehicle.

4. The vehicle of claim 1, wherein the [state] *overall condition* of the vehicle diagnosed by said processor includes angular motion of the vehicle.

7. The vehicle of claim 1, wherein the [state] *overall condition* of the vehicle diagnosed by said processor includes a determination of a location of an impact between the vehicle and another object.

10. The vehicle of claim 9, further comprising a weight sensing system coupled to a seat in the vehicle for sensing the weight of an occupying item of the seat, said weight sensing system being coupled to said processor and said processor controlling the occupant restraint device based on the [state] *overall condition* of the vehicle and the weight of the occupying item of the seat sensed by said weight sensing system.

11. The vehicle of claim 1, wherein said processor includes pattern recognition means for diagnosing the [state] *overall condition* of the vehicle.

12. The vehicle of claim 1, further comprising a display coupled to said processor for displaying an indication of the [state] *overall condition* of the vehicle as diagnosed by said processor.

13. The vehicle of claim 1, further comprising a warning device coupled to said processor for relaying a warning to an occupant of the vehicle relating to the [state] *overall condition* of the vehicle as diagnosed by said processor.

14. The vehicle of claim 1, further comprising a transmission device coupled to said processor for transmitting a signal to a remote site relating to the [state] *overall condition* of the vehicle as diagnosed by said processor.

15. The vehicle of claim 1, wherein the [state] *overall condition* of the vehicle includes angular acceleration, a plurality of said sensor systems comprising accelerometers such that said processor determines the angular acceleration of the vehicle based on the acceleration measured by said accelerometers.

18. The vehicle of claim 1, wherein the [state] *overall condition* of the vehicle diagnosed by said processor includes angular acceleration of the vehicle whereby angular velocity and angular position or orientation are derivable from the angular acceleration the at least one part being a navigation system, said processor being arranged to control said navigation system based on the angular acceleration of the vehicle.

36. The vehicle of claim 33, wherein the state of the vehicle diagnosed by said [processor] *pattern recognition system* includes angular orientation, velocity or acceleration of the vehicle.

37. The vehicle of claim 33, wherein the at least one part is a system selected from a group consisting of a steering system, a braking system or a throttle system, said [processor] *pattern recognition system* being arranged to control the system in an attempt to maintain stability of the vehicle.

38. The vehicle of claim 33, wherein the at least one part is an occupant restraint device, said [processor] *pattern recognition system* being arranged to control the occupant restraint device in an attempt to minimize injury to an occupant.

46. The [method] *vehicle* of claim 33, wherein said pattern recognition system comprises a neural network system and the state of the vehicle diagnosed by said neural network system includes a state of an abnormally operating component, said neural network system including a first neural network arranged to identify a potentially malfunctioning component based on the state of the component measured by said sensor systems and a plurality of additional neural networks, each being trained to determine whether a specific component is operating abnormally, whereby the measurements of the state of the component from said sensor systems are input into that one of the additional neural networks trained on a component which is substantially identical to the identified component.

52. The method of claim 48, wherein the at least one part is an occupant restraint device, the step of controlling the at least one part comprising the [steps] *step* of controlling the system in an attempt to minimize injury to an occupant in the event of a crash.

60. In a motor vehicle having a seat, a control system for controlling at least one part of the vehicle based on occupancy of the seat, comprising:
   *a plurality of sensor systems mounted at different locations on the vehicle, each of said sensor systems providing a measurement related to a state of said sensor system or a measurement related to a state of the mounting location,*
   a plurality of strain gages mounted in connection with the seat, each of said strain gages measuring strain of a respective mounting location caused by occupancy of the seat, and a processor coupled to said strain gages and *to said sensor systems and* arranged to determine the weight of an occupying item based on the strain measurements from said strain gages over a period of time *and diagnose the state of the vehicle based on the measurements of said sensor systems*, said processor being arranged to control the at least one part based at least in part on the determined weight of the occupying item of the seat *and the diagnosed state of the vehicle*.

63. The vehicle of claim 60, wherein said sensor systems are different sensor systems and the diagnosis of the state of the vehicle is other than a diagnosis of the state of the at least one part.

64. The vehicle of claim 60, wherein the at least one part is an occupant restraint or protection device which restrains or protects an occupant in a crash involving the vehicle, said processor being arranged to control said occupant restraint or protection device.

65. The vehicle of claim 64, wherein the diagnosis of the state of the vehicle is a diagnosis of the condition of the vehicle with respect to whether the vehicle is experiencing excessive angular inclination, the vehicle is experiencing a crash or the vehicle is skidding.

66. The vehicle of claim 1, wherein said sensor systems are mounted separate and apart from the at least one part being controlled by said processor.

67. The method of claim 19, wherein the diagnosis of the state of the vehicle is a diagnosis of the condition of the vehicle with respect to its stability.

68. The method of claim 19, wherein the sensor systems are different sensor systems and the diagnosis of the state of the vehicle is other than a diagnosis of the state of the at least one part.

69. The method of claim 19, wherein the step of mounting the sensor systems at different locations on the vehicle comprises mounting the sensor systems separate and apart from the at least one part being controlled.

70. The vehicle of claim 33, wherein the diagnosis of the state of the vehicle is a diagnosis of the condition of the vehicle with respect to its stability.

71. The vehicle of claim 33, wherein the diagnosis of the state of the vehicle is other than a diagnosis of the state of the at least one part.

72. The vehicle of claim 33, wherein said sensor systems are mounted separate and apart from the at least one part being controlled by said processor.

73. The method of claim 48, wherein the state of the vehicle is a diagnosis of the condition of the vehicle with respect to its stability.

74. The method of claim 48, wherein the diagnosis of the state of the vehicle is other than a diagnosis of the state of the at least one part.

75. The method of claim 48, wherein the step of mounting the sensor systems on the vehicle comprises mounting the sensor systems separate and apart from the at least one part being controlled.

\* \* \* \* \*